United States Patent [19]

Aske

[11] Patent Number: 4,498,342
[45] Date of Patent: Feb. 12, 1985

[54] INTEGRATED SILICON ACCELEROMETER WITH STRESS-FREE REBALANCING

[75] Inventor: Vernon H. Aske, Minnetonka, Minn.

[73] Assignee: Honeywell Inc., Minneapolis, Minn.

[21] Appl. No.: 486,144

[22] Filed: Apr. 18, 1983

[51] Int. Cl.³ ............................................ G01P 15/13
[52] U.S. Cl. ................................................... 73/517 B
[58] Field of Search ............ 73/517 R, 517 B, 862.65, 73/862.67; 338/46, 47; 73/516 R

[56] References Cited

U.S. PATENT DOCUMENTS

| | | | |
|---|---|---|---|
| 3,030,814 | 4/1962 | Ainsworth | 73/517 B |
| 3,572,109 | 3/1971 | Yerman | 73/862.67 |
| 3,788,149 | 1/1974 | Wilner | 338/46 |
| 4,129,042 | 12/1978 | Rosvold | 73/517 R |
| 4,186,324 | 1/1980 | Hartzell | 73/517 B |
| 4,250,757 | 2/1981 | Hanson | 73/517 B |

FOREIGN PATENT DOCUMENTS 763226  12/1956  United Kingdom ............. 73/517 B

Primary Examiner—James J. Gill
Attorney, Agent, or Firm—George W. Field

[57] ABSTRACT

An accelerometer comprising a member of silicon subjected to physical changes in response to the linear accelerations, elements integrated into the surface of the member for generating, amplifying and supplying an output determined by those changes, and means responsive to said output for overcoming said physical changes.

2 Claims, 4 Drawing Figures

INTEGRATED SILICON ACCELEROMETER WITH STRESS-FREE REBALANCING

The Government has rights in this invention pursuant to Contract No. N62269-82-C-0077.

TECHNICAL FIELD

This invention relates to the field of instruments for measuring linear accelerations, particularly accelerations of small magnitude.

BACKGROUND OF THE INVENTION

Devices responsive to linear acceleration perform essential sensing functions in a wide variety of systems. As performance requirements and available technology have advanced, the demand has increased for sensors characterized by much improved sensitivity, stability, accuracy, linearity of response, reliability and ruggedness, in addition to fast reaction time, minimum cross-coupling, small size, and low cost. Implicit in the stability, sensitivity and linearity requirements is a requirement that precision be maintained over a wide temperature range. The present state of the art is such that it has been difficult to achieve improvements in all of the foregoing characteristics simultaneously, or, in some instances, even to achieve improvement in one characteristic without adversely affecting another. Nevertheless, requirements exist, particularly in aircraft navigation and missile guidance systems, for an acceleration sensor with superior performance in all the noted areas.

A major error source in known accelerometers is bias instability, which results unless the mechanical null of the suspension system and the electrical null of the pickoff system remain coincident.

BRIEF SUMMARY OF THE INVENTION

The present invention minimizes bias instability in an accelerometer system by sensing departure of the system from its mechanical null and rebalancing the system to maintain this mechanical null. It also reduces cross-coupling errors by use of velocity loop damping, and embodies air-damping gaps to protect against shocks and vibrations when the rebalancing system is not energized. Use of direct current pickoffs and velocity loop damping makes the electronic circuits simple enough to be integrated as microcircuitry into the accelerometer moving element, which is of creep-resistant silicon.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, in which like reference numerals indicate corresponding parts throughout the several views.

DESCRIPTION OF THE PREFERRED EMBODIMENT

Figure 1:
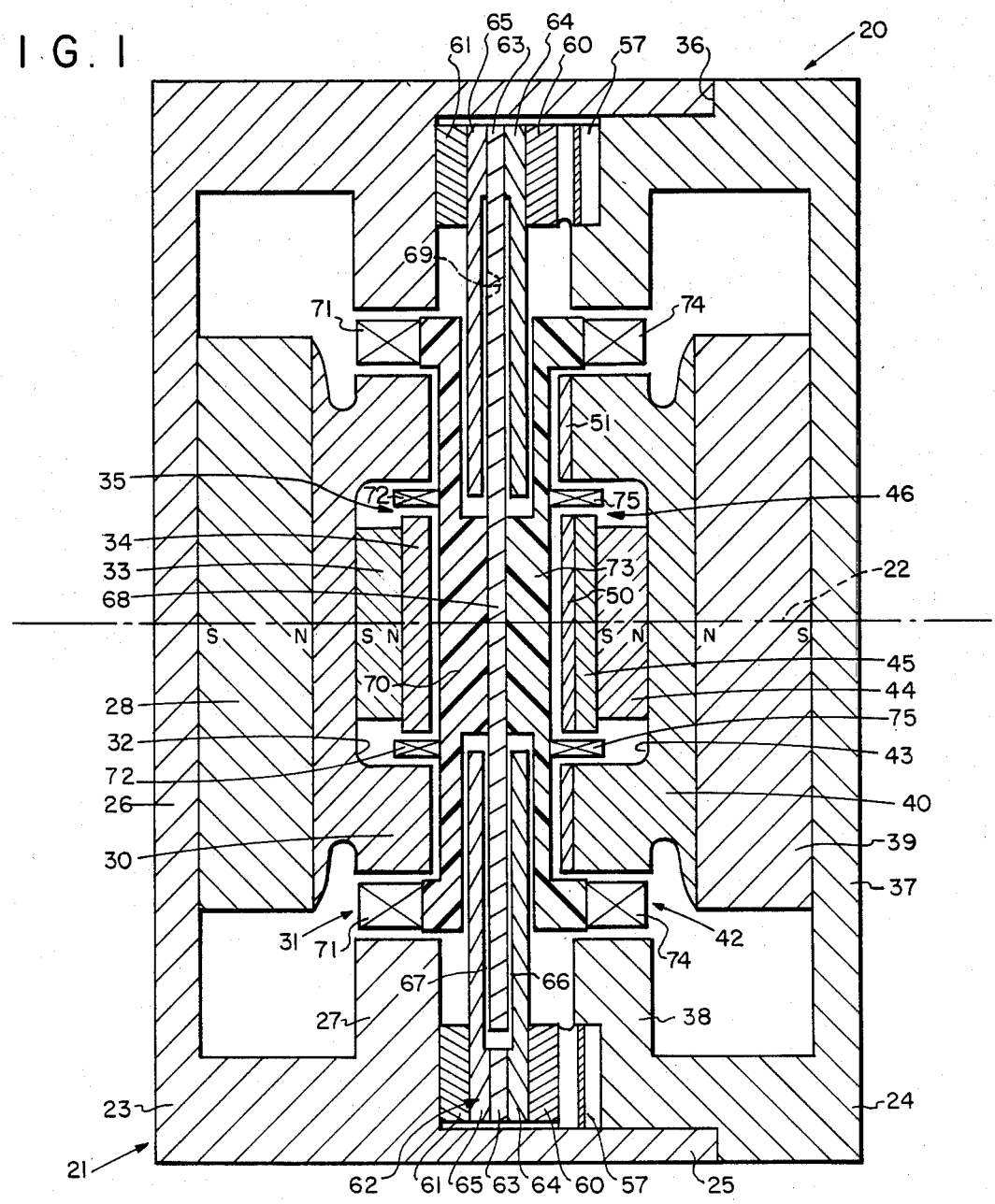
FIG. 1 is a generally axial cross-sectional view of an accelerometer embodying the invention, on an enlarged scale.

An accelerometer 20 according to the invention is shown in FIG. 1 to include a housing 21 which is cylindrical about an axis 22 and includes interfitting hollow casing members 23 and 24 of Hipernik or other magnetically conductive material. In one design of the accelerometer the diameter of the housing was $\frac{3}{4}''$ and its axial dimension was $\frac{1}{2}''$.

Member 23 includes a rim 25 to receive member 24, a flat end wall 26, and an inturned ledge 27. A permanent magnet 28, having the configuration of a disc with magnetic poles at the faces of the disc, is centrally secured with one pole against end wall 26 of the cavity of member 23, and a pole piece 30 of Hipernik is secured to the inner pole of magnet 28 to define with the rim of ledge 27 an annular magnetic gap 31.

The inner surface of pole piece 30 is formed with a cylindrical hollow 32 in which is received a second permanent magnet 33, also of disc form with magnetic poles at the faces of the disc, and a second pole piece 34 of Hipernik is secured to the inner pole of magnet 33 to define with the inner rim of hollow 32 a second annular magnetic gap 35.

Casing member 24 has a shoulder 36 to engage rim 25 of member 23, but is otherwise constructed generally like member 23, having a flat end wall 37 and a ledge 38. A third permanent magnet 39 of disc form is centrally mounted in member 24, and is provided with a pole piece 40 of Hipernik identical with pole piece 30 to define with the inner rim of ledge 38 of member 24 a third annular magnetic gap 42. Pole piece 40 has a hollow 43 to receive a fourth permanent magnet 44 of disc form, which is provided with a pole piece 45 of Hipernik to define with the inner rim of hollow 43 a fourth annular magnetic gap 46. The magnets are preferably arranged with their polarities, along axis 22, as suggested in FIG. 1.

For reasons of geometry presently to be explained, pole piece 45 is capped with a disc 50 of titanium, and pole piece 40 is capped with a flat ring 51 of titanium.

Mounted between members 23 and 24 by a wave washer 57 and annular spacers 60 and 61 is a sensing capsule 62 comprising a flexure member 63 of silicon, bonded peripherally to damping rings 64 and 65, also of silicon. Rings 64 and 65 are of reduced thickness, except at their rims, on the faces apposed to flexure member 63, to afford air damping spaces 66 and 67, and member 63 comprises a central disc or pendulum 68 supported at flexures 69. A bobbin 70 is centrally secured to one surface of member 63 to project through damping ring 65, and carries a first signal coil or winding 71 in gap 31, and a first torquer coil 72 in gap 35. A similar but not identical bobbin 73 is secured to the other surface of member 63 to project through damping ring 64, and carries a second signal coil or winding 74 in gap 42 and a second torquer winding 75 on gap 46. The annular spaces in the surfaces of pendulum 68 surrounding bobbins 70 and 73 are available for large scale integrated microcircuitry.

Figure 2:
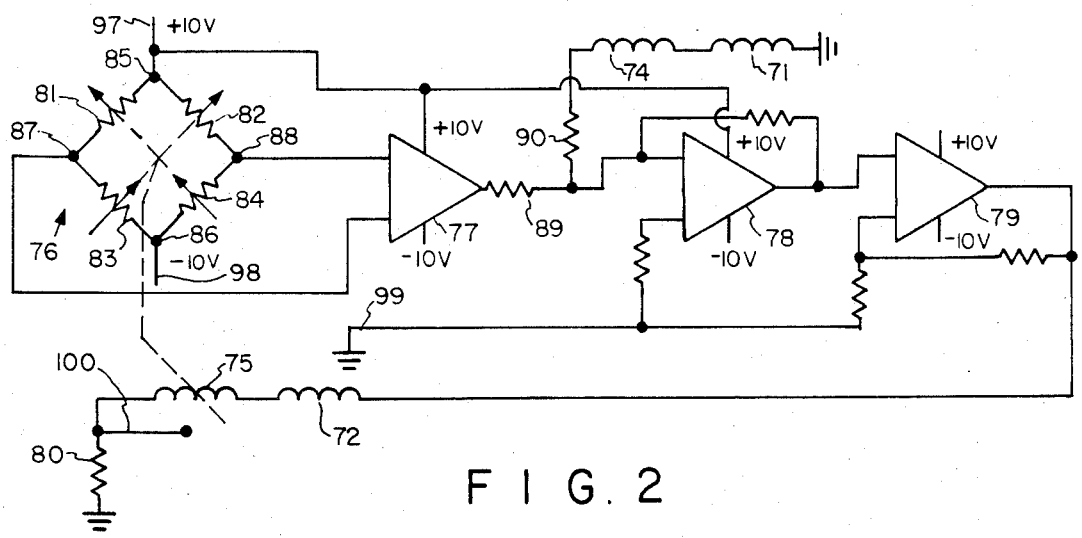
FIG. 2 is a wiring diagram showing circuitry usable in practicing the invention.

The microcircuitry, shown in FIG. 2, includes a strain bridge 76, a preamplifier 77, a summing amplifier 78, a driver amplifier 79, and a readout resistor 80.

Bridge 76 includes four strain sensitive resistors 81, 82, 83, and 84, as described below, connected in a bridge circuit and having input terminals 85 and 86, energized with direct current, and output terminals 87 and 88, giving a direct current bridge signal representative of the deviation of the pendulum at its flexures from its mechanical null. The bridge signal is amplified in preamplifier 77, together with a velocity signal supplied through a second summing resistor 90 by coils 71 and 74 when they move in gaps 31 and 42. The output of summing amplifier 78 energizes driver amplifier 79, whose output in turn is supplied through torquer windings 72 and 75 to readout resistor 80, the coils acting in magnetic gaps 35 and 46 to restore pendulum 68 to its mechanical null position and so reduce the bridge output to null, and the resultant voltage across resistor 80 being a measure of the mechanical force required to reestablish the null position and hence of the acceleration acting on the pendulum about its flexures.

Figure 3:
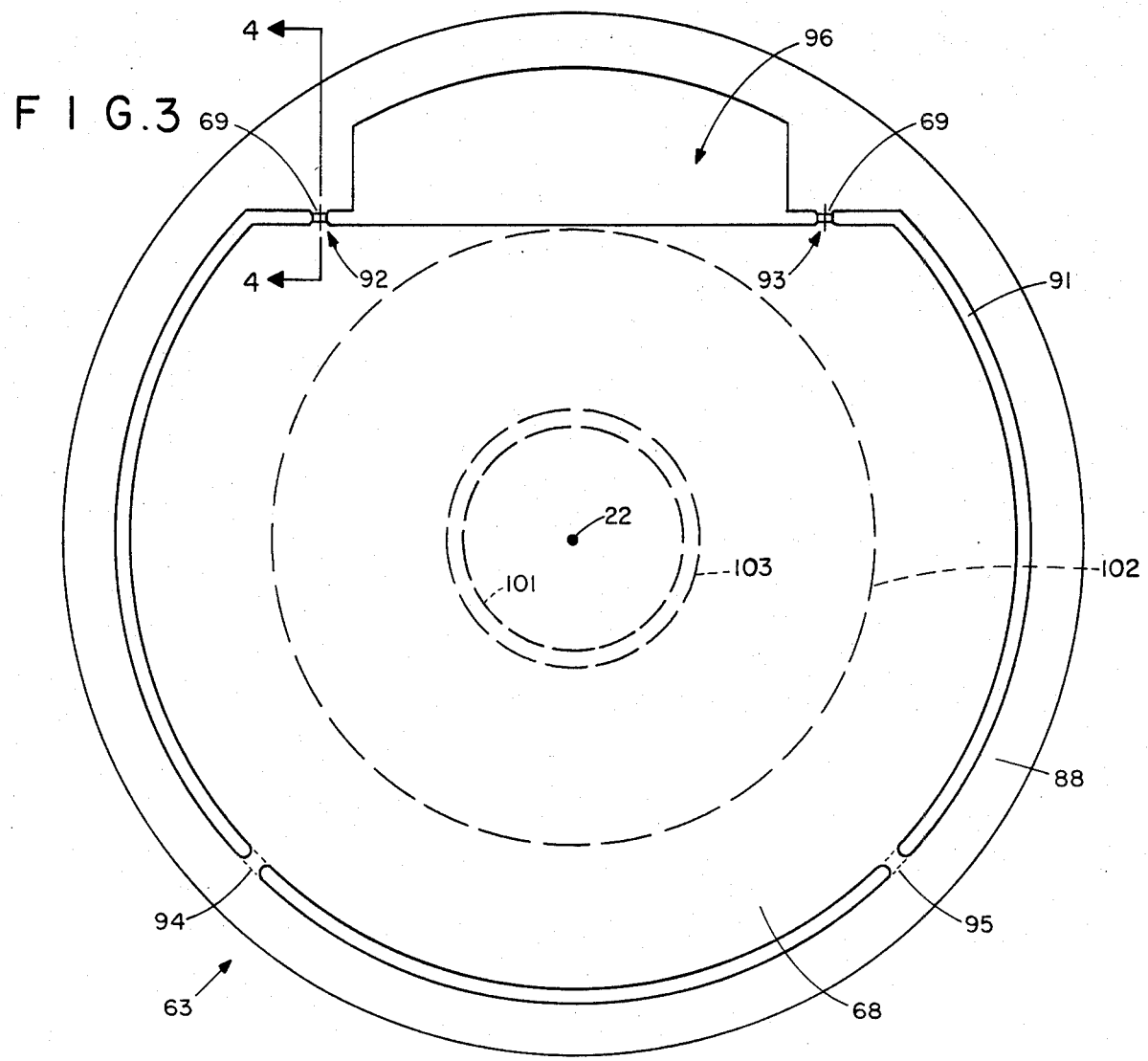
FIG. 3 is an enlarged view showing a flexure member of the invention during manufacture.
Figure 4:
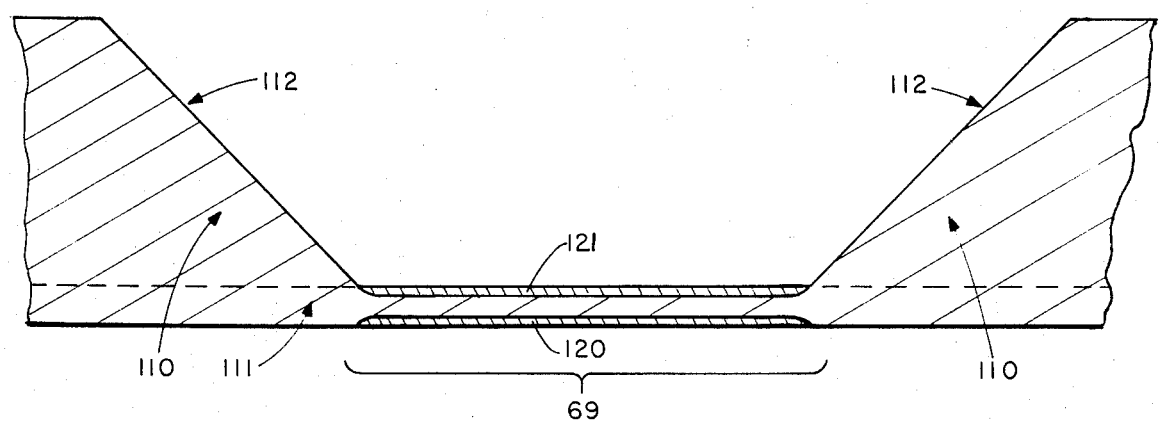
FIG. 4 is a further enlarged fragmentary sectional view generally along the line 4—4 of FIG. 3.

FIGS. 3 and 4 show flexure member 63, in the process of construction, to comprise an inner plate or pendulum 68 connected to an outer supporting or mounting plate 88 at flexures 69. To make member 63, a sheet or substrate of single crystal p-silicon, and of the desired diameter, is cut and polished to a desired thickness such as 15 mils. From one face of this substrate is epitaxially grown an etch-stop layer of n-silicon about 1 mil in thickness.

By a controlled electro-etching process the sheet is etched in a pattern shown to comprise a circular groove 91 separating outer plate or ring 88 from inner plate or disc 68, the groove being interrupted at hinge sites 92 and 93 for flexures 69 and at further sites 94 and 95 for providing temporary bridging support. Hinge sites 92 and 93 are angularly spaced about the center of the circle by less than 180 degrees, by 78 degrees for example, and sites 94 and 95 are spaced by about 90 degrees. Sites 92-95 are now chemically protected as the etching is continued until groove 91 becomes a slot passing entirely through the material and separating pendulum 68 from plate 88 except at the protected sites, the slot being enlarged at 96 to provide a passageway through member 63 for the positive and negative direct current leads 97 and 98, a ground lead 99, and an output conductor 100, all shown in FIG. 2.

The broken line circle 101 in FIG. 3, about a center through which axis 22 will pass in the assembled accelerometer, shows the area of bobbin affixation to the disc, circle 102 shows the outer diameter of the bobbin, and circle 103 shows the inner diameter of the damping rings. The surface of pendulum 68 radially outward from line 101 are available for application of large scale integrated circuitry making up components 77-79, 89 and 90 of FIG. 2.

A portion of the strain bridge as applied to flexures 69 is shown greatly enlarged in FIG. 4. Here, the heavily doped substrate is shown at 110, the epitaxially grown layer at 111, and the groove at 112. At each of flexures 69 a first layer 120 and a second layer 121 of impurity boron are implanted into the opposite surfaces of the flexure to form strain sensitive resistance elements.

After the microcircuitry and strain bridge resistor have been deposited and implanted and the prewound bobbins have been affixed to disc 68, and the necessary interconnections have been made, the mechanical support bridges at sites 94 and 95 are removed, the magnets and pole pieces are installed in casing members 23 and 24, and the housing is assembled. It will be evident that the mass of pendulum 68 is not centered in the thickness of member 63 at flexures 69, but is nearer the lower face as seen in FIG. 4. To compensate for this, bobbin 70 is made slightly thicker than bobbin 73, so that the center of mass of the entire moving system is in the plane of flexure. Titanium members 50 and 51 are added to pole pieces 45 and 40 to insure that the air damping spaces on both sides of the moving assembly are the same, when identical pole pieces 30 and 40 are used, thus requiring no modification of the magnetic circuit.

While the structure is shown as circular symmetrical about axis 22, it will be realized that rectangular or other configurations may also be used.

From the foregoing it will be evident that the invention comprises a small, reliable instrument in which linear acceleration is sensed directly as the departure of a sensing pendulum of silicon from its mechanical null, without the interposition of any auxilliary electrical response system and the accompanying probability of a different null state therein from that corresponding to the null state of the pendulum itself.

Numerous characteristics and advantages of the invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. An accelerometer for sensing accelerations along an axis comprising, in combination:
   a flexure member comprising an inner plate separated from an outer plate except at a pair of hinge sites spaced around said axis by less than 180 degrees so that the inner plate is unbalanced about a line passing through the hinge sites, at least one of the hinge sites including strain sensitive means giving outputs in accordance with deviation of said member from a position of mechanical null;
   means mounting said flexure member for acceleration in directions orthogonal to said inner plate;
   rebalance coil means secured to said inner plate, magnetic means carried by the mounting means for cooperating with said coil means, and means energizing said coil means in accordance with said outputs to restore said inner plate to said mechanical null.

2. In an accelerometer, in combination:
   a flexure member comprising an epitaxially grown sheet of single crystal silicon including a central disc separated from an outer ring except at a pair of hinge sites spaced around the circumference of the disc by less than 180 degrees so that the disc is unbalanced about a line passing through the hinge sites, at least one of the hinge sites being implanted on opposite surfaces with impurity boron to form strain sensitive pickoff means;
   means mounting said flexure member for acceleration in a direction orthogonal to said disc;
   rebalance coil means secured to said inner plate, magnetic means carried by the mounting means for cooperation with said coil means, and large scale integrated circuitry on said disc including means energizable to give outputs in accordance with the responses of said strain sensitive means and means energizing said rebalance coil means in accordance with said outputs.

* * * * *